(12) United States Patent
Ikebe et al.

(10) Patent No.: US 7,641,797 B2
(45) Date of Patent: Jan. 5, 2010

(54) METHOD OF TREATING WASTE LIQUID FROM PRODUCTION PLANT FOR HYDROCARBONS OR OXYGEN-CONTAINING COMPOUNDS

(75) Inventors: Hiroaki Ikebe, Narashino (JP); Masayuki Uchida, Narashino (JP); Hitoshi Betchaku, Funabashi (JP)

(73) Assignees: Toyo Engineering Corporation, Tokyo (JP); Water Re-Use Promotion Center, Tokyo (JP)

( * ) Notice: Subject to any disclaimer, the term of this patent is extended or adjusted under 35 U.S.C. 154(b) by 279 days.

(21) Appl. No.: 11/665,732

(22) PCT Filed: Oct. 21, 2005

(86) PCT No.: PCT/JP2005/019836

§ 371 (c)(1),
(2), (4) Date: Apr. 18, 2007

(87) PCT Pub. No.: WO2006/043726

PCT Pub. Date: Apr. 27, 2006

(65) Prior Publication Data

US 2007/0289923 A1    Dec. 20, 2007

(30) Foreign Application Priority Data

Oct. 22, 2004  (JP)  ............... 2004-307813

(51) Int. Cl.
*C02F 3/00* (2006.01)
(52) U.S. Cl. ............... 210/606; 210/749; 210/764; 210/908
(58) Field of Classification Search .......... 210/908, 210/764, 749, 606
See application file for complete search history.

(56) References Cited

U.S. PATENT DOCUMENTS

| | | | | |
|---|---|---|---|---|
| 4,338,196 A | * | 7/1982 | Mayerle | 210/610 |
| 4,824,577 A | * | 4/1989 | Schwitzgebel | 210/665 |
| 6,126,830 A | * | 10/2000 | Marshall | 210/627 |
| 6,268,204 B1 | * | 7/2001 | Miller et al. | 435/262.5 |
| 6,946,073 B2 | * | 9/2005 | Daigger et al. | 210/605 |

FOREIGN PATENT DOCUMENTS

| | | |
|---|---|---|
| JP | 51-145168 | 12/1976 |
| JP | 53-144149 | 12/1978 |
| JP | 07-232178 | 9/1995 |
| JP | 08-024885 | 1/1996 |
| JP | 09-253696 | 9/1997 |
| JP | 11-019685 | 1/1999 |
| JP | 11-019686 | 1/1999 |
| JP | 2003-024991 | 1/2003 |
| JP | 2003-136087 | 5/2003 |
| JP | 2003260449 A | * 9/2003 |

OTHER PUBLICATIONS

English language Abstract of JP JP2003260449 A.*

* cited by examiner

*Primary Examiner*—Chester T Barry
(74) *Attorney, Agent, or Firm*—Flynn, Thiel, Boutell & Tanis, P.C.

(57) ABSTRACT

A method for treating a formaldehyde-containing waste liquid, which is formed as a byproduct in a plant for the production of hydrocarbons or oxygen-containing compounds, containing the steps of: subjecting formaldehyde in the liquid to chemical treatment; and treating the resulting waste liquid, while being aerated, by using a membrane bioreactor that is composed of a microorganism or enzyme and a separation membrane.

21 Claims, 2 Drawing Sheets

METHOD OF TREATING WASTE LIQUID FROM PRODUCTION PLANT FOR HYDROCARBONS OR OXYGEN-CONTAINING COMPOUNDS

TECHNICAL FIELD

The present invention relates to a method of treating waste liquid, which is formed from a plant for the production of hydrocarbons or oxygen-containing compounds.

BACKGROUND ART

Industrial waste liquid may contain formaldehyde or methanol. Such waste liquid is discharged after it is treated to make the concentration of formaldehyde fit a waste liquid standard. As a method of treating formaldehyde or methanol in the waste liquid, the activated sludge method is used, in many cases.

In the activated sludge method, formaldehyde: a material originally harmful to living things, is treated with microorganisms, and in the treatment, a stage called "acclimatization" raises the concentration of formaldehyde gradually, causing the microorganisms to gain resistance against formaldehyde, and simultaneously causing the microorganisms to decompose formaldehyde, whereby waste liquid having a target formaldehyde concentration is treated. During acclimatization, it is possible to treat only formaldehyde-containing waste liquid having a concentration of a fraction of several tens or several hundreds of a target formaldehyde concentration, or having a smaller concentration. Thus, it is necessary to wait several months before treatment of waste liquid having the target formaldehyde concentration can be performed.

JP-A-11-19685 ("JP-A" means unexamined published Japanese patent application), JP-A-11-19686, JP-A-9-253696, and JP-A-7-232178 disclose methods of treating formaldehyde-containing waste liquid, in which the period of acclimatization can be made short or is not required. JP-A-11-19685 and JP-A-11-19686 describe methods of using a specific microorganism capable of decomposing high-concentration formaldehyde. Further, JP-A-9-253696 and JP-A-7-232178 describe methods of decomposing formaldehyde without using any activated sludge. The methods described in JP-A-9-253696 and JP-A-7-232178, which are different from any activated sludge method, require the setting up of facilities and catalysts, to raise the temperature and pressure of waste liquid to be treated.

On the other hand, as to facilities for waste liquid treatment in the activated sludge method, JP-A-8-24885 discloses a method of using a microfiltration membrane filter, thereby omitting a sedimentation tank for sludge, which is conventionally necessary in the activated sludge method, and saving on facility-installation space.

Incidentally, in recent years, the demand for water has been increasing, based on a rising population, and the amount of water that can be used per person has been increasing, based on improvement in the level of living, while new development of water (fresh water) resources has not been pursued. Further, the demand for water that can be used to produce food has also been increasing, from the rise in population. As a result, distribution of water resources between daily life water and agricultural water has been coming to the fore as a new problem.

To obtain fresh water by seawater desalting, it is essential that a place therefor is geographically near the sea. Further, to remove salts and the like from seawater, it is necessary to consume energy of a heat source or the like.

Meanwhile, waste water or sullage discharged (formed) following reactions in chemical plants or the like, is treated for reuse as a raw material water, boiler feed water, cooling water, or the like in plants, industrial complexes, or the like. In general, however, water generated by chemical reaction contains a variety of salts, reaction products, or compounds harmful to the human body, in many cases. In particular, salts are easily dissolved in water; and, metal components of pipes used in plant, catalysts used in the reaction, and the like may be present as salts in aqueous solution. In many cases, it is difficult to remove such salts by filtration or some other operation, or to remove only the salts selectively and effectively. For this reason, great cost is necessary to treat waste liquid to such a level that the resultant waste liquid can be used as life water or agricultural water. Thus, in general, the treatment has not been conducted.

DISCLOSURE OF INVENTION

According to the present invention, the following means are provided:

(1) A method for treating a formaldehyde-containing waste liquid, which is formed as a byproduct in a plant for the production of hydrocarbons or oxygen-containing compounds, comprising the steps of:
  subjecting formaldehyde in the liquid to chemical treatment; and
  treating the resulting waste liquid, while being aerated, by using a membrane bioreactor that is composed of a microorganism or enzyme and a separation membrane;

(2) The method for treating the waste liquid according to item (1), wherein the membrane bioreactor is provided with activated sludge;

(3) The method for treating the waste liquid according to item (1) or (2), wherein the chemical treatment is conducted by converting formaldehyde to formic acid;

(4) The method for treating the waste liquid according to any one of items (1) to (3), which comprises the step of: filtrating after the treating step with the membrane bioreactor;

(5) The method for treating the waste liquid according to item (4), wherein the filtrating is reverse osmosis filtration;

(6) The method for treating the waste liquid according to item (4) or (5), which comprises the step of: sterilizing after the filtrating step;

(7) The method for treating the waste liquid according to item (6), which comprises the step of: adding a mineral or fertilizer after the sterilizing step;

(8) A method for producing reclaimed water, comprising: using the method for treating the waste liquid according to any one of items (1) to (7); and (9) The method for producing reclaimed water according to item (8), which is performed by treating waste liquid formed as a byproduct in the step of producing dimethyl ether from a hydrocarbon via methanol, or the step of producing liquid fuel oil from natural gas via synthetic gas.

In the present invention, the term "reclaimed water" means to include life water (domestic water) including drinking water, plant-cultivating water, agricultural water, intermediate water (middle or gray water), or industrial water including boiler feed water, each of which is obtained by treating waste liquid.

According to the present invention, formaldehyde-containing waste liquid (byproduct water) that is formed as a byproduct in a plant for the production of hydrocarbons or oxygen-containing compounds can be effectively treated at low costs, and the resultant waste liquid can be reused as a new water resource (reclaimed water) for domestic water, a typical example thereof being drinking water, plant-cultivating water, agricultural water, intermediate water, industrial water, or some other water.

Other and further features and advantages of the invention will appear more fully from the following description, taken in connection with the accompanying drawings.

BEST MODE FOR CARRYING OUT THE INVENTION

Figure 1:
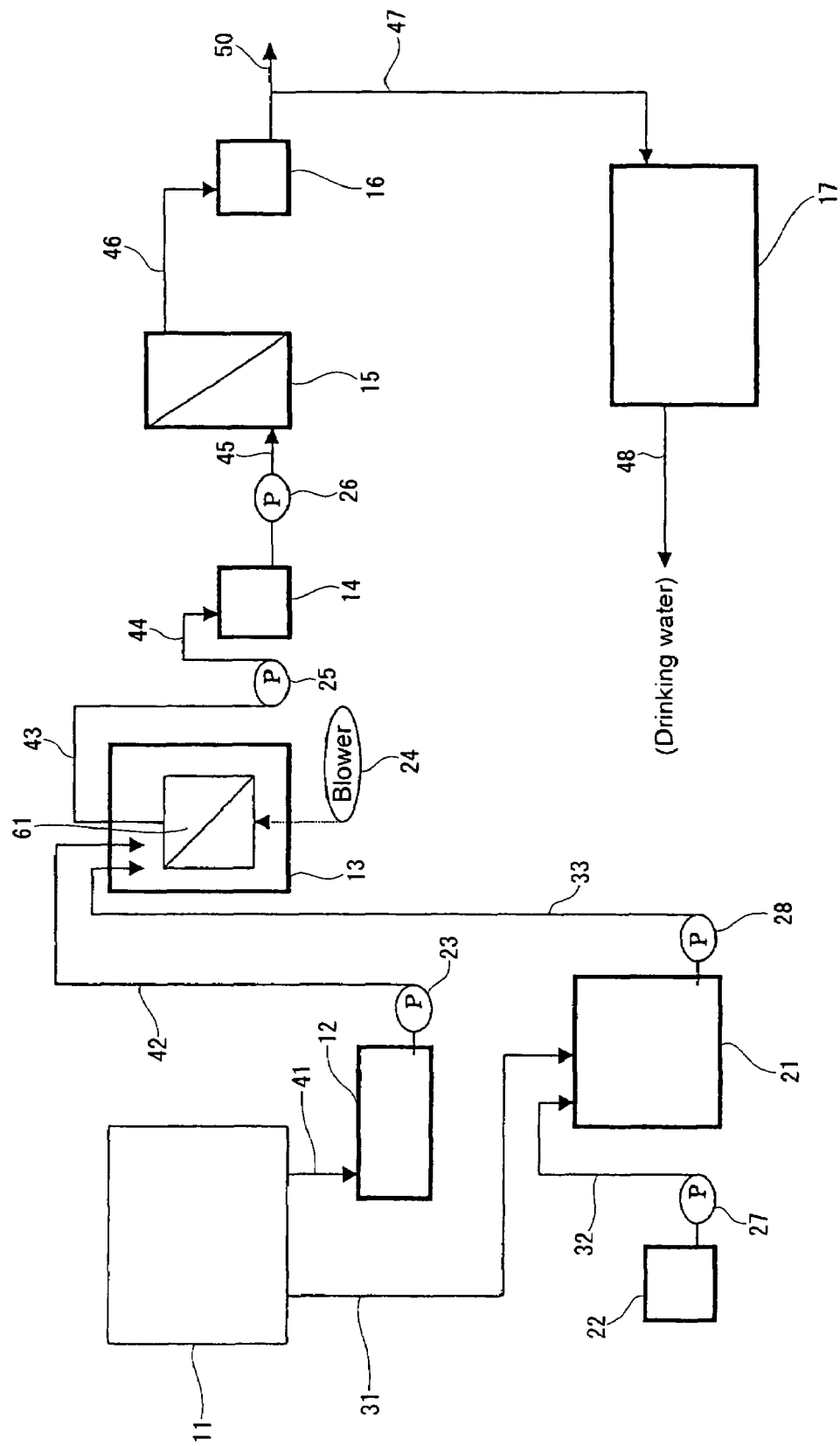
FIG. 1 is a schematic view of an example of a preferred facility for carrying out the present invention.

The present inventors, having made eager investigations, have found out that waste liquid formed as a byproduct in a plant for producing an oxygen-containing compound, such as dimethyl ether (referred to as 'DME' herein), or a liquid hydrocarbon, such as GTL (gas to liquid, liquid fuel oil produced from natural gas via synthetic gas), contains formaldehyde, methanol, formic acid, or the like as trace constituents; however, the waste liquid hardly contains any salt or metal, or it contains a salt or metal merely to such a degree that no problem is caused when the waste liquid is used as domestic water or agricultural water. Further, the inventors have found out that this waste liquid can be effectively reused at low costs, for example, as domestic water including drinking water, agricultural water, or industrial water, by treating the waste liquid with a membrane bioreactor. The present invention has been completed based on such findings.

The present invention will be described in detail hereinafter.

One of the characteristics of the present invention resides in the treating, for, as a subject therefor, formaldehyde-containing waste liquid which is formed as a byproduct in a plant for the production of oxygen-containing compounds such as dimethyl ether (DME), or liquid hydrocarbons such as GTL (gas to liquid, liquid fuels from gaseous components). This is based on that the waste liquid contains formaldehyde, methanol, formic acid or the like as a trace component, but the waste liquid hardly contains any salt or metal or it contains a salt or metal merely to such a degree that no problem is caused when the waste liquid is used as domestic water or agricultural water.

In general, water generated by chemical reaction contains a variety of salts, reaction products, or compounds harmful to the human body, in many cases. In particular, salts are easily dissolved in water; and, metal components of pipes used in plant, catalysts used in the reaction, and the like may be present as salts in aqueous solution. It is difficult to remove such salts by filtration or some other operation, or to remove only the salts selectively and effectively, which is hindrance for the use of the waste liquid as drinking water from the viewpoint of treating costs and technique. For this reason, although various methods for treating waste liquids have been developed, great cost is necessary to treat waste liquid to such a level that the resultant waste liquid can be used as life water or agricultural water. Usually, therefore, the treatment has not been conducted.

Meanwhile, it has been found out that in the production, for example, of DME, formed as byproducts are water, ethanol, formaldehyde, formic acid, and the like, but a salt material such as an ammonium salt or a chloride salt is not produced.

Attention has been paid to a matter that formaldehyde-containing waste liquid formed as a byproduct in a plant for the production of a hydrocarbon or an oxygen-containing compound hardly contains any salt or metal, and thus the present invention has been made. According to the present invention, waste liquid can be treated to such a level that the waste liquid can be effectively used as domestic water or agricultural water at low costs.

Examples of the hydrocarbons or oxygen-containing compounds produced in a plant from which waste liquid to which the present invention can be applied is discharged, include oxygen-containing compounds such as dimethyl ether and methanol; and hydrocarbons formed via GTL (gas to liquid). The waste liquid formed as a byproduct in the production of the above substances hardly contains any salt or metal. Raw materials thereof may be carbon monoxide and hydrogen, which are produced by a steam reforming method of steam and a hydrocarbon material such as natural gas; or carbon monoxide and hydrogen, which are produced by partial oxidization reaction based on reaction between a hydrocarbon material, such as natural gas, and an oxidizer, such as oxygen, oxygen-rich air, or the air. Herein, the term "hardly contains any salt or metal" means that the concentrations of salts or metals in a liquid are as follows: for example, the concentration of nickel is 0.5 mg/L or less, that of cobalt or chromium is 0.02 mg/L or less, that of $SO_4$ (sulfates) is 1 mg/L or less, and that of Cl (chlorides) is 5 mg/L or less.

Preferred examples of the steps in the method of the present invention are as follows:
(1) Conversion of formaldehyde
(2) Treatment with a membrane bioreactor
(3) Filtrating
(4) Sterilizing
(5) Adding of a mineral or the like A preferred embodiment of the present invention will be described in detail based on the attached drawings.

FIG. 1 is a schematic view of a preferred facility for carrying out the present invention.

In FIG. 1, the preferred waste liquid treating facility for carrying out the present invention is comprised of a waste liquid equalizing tank (pit) 12, a formaldehyde converting tank 21, a membrane bioreactor (referred to as 'MBR' hereinafter) aeration tank 13, a filtrating section 15, and a sterilizing section 17.

The pit 12 is set up in order to level out the amount of water to be treated that will flow into treating steps subsequent thereto (the downstream side). The material and capacity thereof are appropriately selected and designed in accordance with a material which is less damaged or deteriorated by a substance(s) contained in the waste liquid to be treated, the treating capacity of the treating facility, and other factors. For example, the pit can be made from reinforced concrete, or a plastic. It is however preferred to avoid a pit made of iron since the iron pit may be corroded.

(1) Conversion of Formaldehyde

In the formaldehyde converting tank 21 (which may be referred to merely as a 'converting tank' hereinafter), formaldehyde is converted to formic acid.

The formaldehyde concentration in waste liquid from a plant for the production of a hydrocarbon or an oxygen-containing compound is as high as 100 to 200 mg/L. Therefore, in order to decompose formaldehyde having this concentration only with microorganisms, it is indispensable to perform an operation of acclimatization until formaldehyde of a target treatment-concentration can be decomposed, with the operation starting from a low concentration (several mg/L) of formaldehyde. However, in the middle course of the acclimatization or during a steady state operation, the microorganisms may die out. Thus, the acclimatization may be an unstable factor for the operation.

On the other hand, formic acid can be decomposed without acclimatizing activated sludge (microorganisms). For this reason, formaldehyde is converted to formic acid, thereby decreasing a risk of the extinction of the microorganisms while keeping the steady state operation easily. Consequently, the treatment can be more easily conducted.

As a method for the conversion, for example, Cannizzaro reaction can be used. In this reaction, an alkali such as sodium hydroxide is added to formaldehyde-containing waste liquid in accordance with the concentration of formaldehyde, thereby converting formaldehyde to methanol and formic acid. For the addition of the alkali, an alkali tank 22 is set up together with the converting tank 21. For reference, sodium is contained in ordinary drinking water, and the amount of sodium hydroxide to be used in the reaction does not damage the quality of drinking water.

The converting method is not limited to Cannizzaro reaction, and may be a method of adding hydrogen peroxide to convert formaldehyde to formic acid and water. Further, a method of oxidizing formaldehyde by aerating, to convert to formic acid, may be used. In that case, a part of formaldehyde is oxidized to formic acid, and additionally methanol or other components diffuse into the air at the time of aeration. The amount of the air to be used in the aeration can be appropriately determined into a suitable amount in accordance with formaldehyde, formic acid and others in the waste liquid.

(2) Treatment with a Membrane Bioreactor

In the membrane bioreactor (MBR) aeration tank 13, a microorganism (activated sludge) is used, to decompose formaldehyde, the concentration of which has been decreased in the converting tank, or other byproducts (such as methanol and formic acid), further into carbon dioxide gas or/and water. According to this MBR, a reaction product permeates through the membrane to be taken out from the system so that no solid-liquid separating operation is necessary. Therefore, any solid-liquid separating section can be omitted, and the MBR contributes largely to the simplification of the treating facility.

The MBR aeration tank 13 is provided with a microorganism or enzyme, and a separating membrane. The microorganism is preferably used in the state of activated sludge.

Examples of the MBR include: a forcible permeation-type MBR, wherein a microorganism or the like is fixed to the inside or outside of a membrane, and a substrate (a material to be decomposed with the microorganism) is decomposed with the microorganism upon permeation of a solution containing the substrate therethrough, thereby separating a product (for example, JP-A-8-24885, JP-B-7-28722 ("JP-B" means examined Japanese patent publication), and Japanese Patent No. 3340356); and a free-type MBR, wherein a microorganism or the like is made free inside a reactor, a substrate is decomposed in this state, thereafter a membrane section is used, to discharge a resultant treated water out of the system, thereby keeping the microorganism or the like inside the system (for example, Japanese Patent No. 3152357). In the present invention, the forcible permeation-type MBR can be used.

Specifically, the MBR aeration tank 13 may be made into a structure as described in JP-A-8-24885. That is, the tank has a structure in which a plurality of hollow fibers are bundled to make a module, an activated sludge, which adheres to the outsides of the hollow fibers to have a given thickness, decomposes byproducts such as formaldehyde, and the thus-treated liquid obtained by the decomposition of the byproducts flows into the insides of the hollow fibers.

In FIG. 1, the membrane bioreactor 13 is constituted with a plurality of hollow fiber membrane modules 61, and the liquid to be treated is supplied to the outside of the membrane modules. In the present invention, an arbitrary hollow fiber membrane module can be used. The size of a unit membrane module and the number of membrane modules to be used can be determined in accordance with the amount of the liquid to be treated. For example, hollow membranes of a microfilter membrane (openings: 0.4 µm), manufactured by Mitsubishi Rayon Co., Ltd., can be used. Furthermore, instead of the hollow fibers, a flat membrane (in a cloth form), manufactured by Kubota Corp., can also be used.

The membrane modules are each composed of a membrane and a construction made of metal or plastic in which the membrane is put. A pipe into which the liquid to be treated flows and a taking-out pipe from which the liquid that has permeated through the membrane is discharged are fitted to the construction. From the hollow fiber membrane modules, the liquid to be treated, in which the byproducts are decomposed with the microorganism, is sent to the next step.

Furthermore, in the case of using activated sludge, the treatment can also be carried out by a method using a sedimentation tank (thickener), as described in JP-A-8-24885. To the above-mentioned method, the method using the hollow fibers is more preferred, since the area where the facility is to be set up can be made small.

In the treatment using the membrane bioreactor, aeration treatment is simultaneously conducted. Herein, the term 'aeration' means an operation for bringing waste liquid into contact with the air sufficiently, and for making a gas which is dissolved in the waste liquid out from the liquid and simultaneously dissolving the air into the waste liquid, by aeration.

The aeration treatment makes it possible to dissolve the air (oxygen) into the liquid to be treated, and to accelerate metabolisms of microorganisms, such as oxidization or anabolism, thereby decomposing formaldehyde effectively. Furthermore, the treatment makes it also possible to remove materials adhering or accumulating onto the separation membrane to be used in the membrane bioreactor, to adjust the thickness of the activated sludge adhering onto the outsides of the hollow fibers appropriately, thereby maintaining the separating performance. Moreover, according to the aeration, iron contained in the liquid to be treated is oxidized with aerating air so as to be precipitated and moved into the activated sludge. Thus, the iron is removed from the liquid to be treated. If more complete removal of the iron is required, the requirement can be met by setting an iron-removing section (a magnet or a filter) in an appropriate region out of those the treating steps.

The air flow rate at the time of the aeration is preferably from 2 to 5 $Nm^3/H$, more preferably from 3 to 4 $Nm^3/H$ per $m^3$ of the membrane.

In the use of the MBR, the separating membrane preferably has a large surface area from the viewpoint of effective treatment.

Further, it is possible to supply, form the outside of the aeration tank, the MBR aeration tank with components necessary for the growth of the microorganism, or other purposes, for example, a phosphorus or nitrogen source.

(3) Filtrating Treatment

The treated liquid, which has been subjected to the treatment with the MBR, can be used as domestic intermediate water (water for which a higher degree of treatment (safety) is not required than for drinking water, the intermediate water being used not for drinking but for washing a toilet, a car or the like), irrigating water, industrial cooling water, or the like. In accordance with required water quality, desired treating steps can be put together. A process in which the same step is carried out plural times may be utilized.

However, in order to use the treated liquid as boiler supplying water or drinking water having a stricter water quality than the waters for use in the above-mentioned usages, the treated liquid needs to be further subjected to filtrating treatment. The treated liquid sent from the MBR aeration tank 13 is further filtrated with a membrane filter(s), to separate microorganisms and any foreign matters incorporated in the treating steps.

From the viewpoint of filtrating efficiency or equipment, it is preferred to use, as the membrane filter(s), a filtrating module(s). The kind of the membrane filter for filtration, the number thereof to be used (the number of modules), and others can be appropriately selected or designed in accordance with the amount to be treated or the quality of water which is a subject to be treated.

Membrane filters can be classified as follows, in view of the filtrating performance thereof:

Microfiltration (MF) is generally used, to filtrate fine particles or microorganisms having a size of 0.01 to several micrometers. In the present invention, any MF membrane can be used. For example, a membrane described in JP-A-2000-70683, JP-A-2004-34031, or the like can be used.

Ultrafiltration (UF) is generally used, to filtrate solutes or particles having a molecular weight of several hundreds to several millions. In the present invention, any UF membrane can be used. For example, a membrane described in JP-A-7-60249, JP-A-2001-96299, or the like can be used.

Reverse osmosis (RO) filtration is generally used, to separate a solvent (or water) and a solute from each other, by applying a pressure, which is larger than the difference in osmotic pressure between a solution at one side of a membrane and another solution at the other side, to the solution having a higher concentration, thereby moving the solvent (or water) to the side of the dilute solution, which is reverse to osmotic phenomenon. In the present invention, any RO membrane can be used. For example, a membrane described in JP-A-7-60249, JP-A-10-57989, or the like can be used. In the present invention, it is most preferred to perform reverse osmosis filtration as the filtrating treatment after the MBR treatment.

The water treated in the aeration tank is subjected to one out of the above-mentioned filtrating treatments as needed, thereby obtaining a target water quality.

(4) Sterilizing Treatment

In the case where the treated liquid is used as drinking water, the liquid is subjected to necessary sterilizing treatment, to cause the quality of the liquid to reach a standard for drinking water, and then the liquid is subjected to necessary examinations. Thus, the whole treatment is finished. The method for the sterilization may be any method, and can be appropriately selected or designed in accordance with the standard for drinking water, and others. Examples of sterilizing means include chlorine, ozone, and ultraviolet rays.

Meanwhile, the level of formaldehyde in drinking water is 0.9 mg/L according to the drinking water standard of the WHO (World Health Organization), and is 0.08 mg/L according to the water supply standard of Japan.

(5) Addition of a Mineral and the Like

Further, according to the need, a mineral and the like can be added to the treated liquid. For example, iodine or fluorine is added to the drinking water, or calcium or magnesium is added thereto in order to adjust the hardness of the resultant water. When the treated liquid is to be used as irrigating water, it is also possible to add fertilizer and the like to the treated liquid and then distribute the resultant liquid.

To use the treated water as boiler supplying water, the amount of oxygen dissolved therein is adjusted and other necessary treatments are applied thereto, and then the resultant liquid can be distributed.

As described in the above, in accordance with the finally-required purposes or usage, necessary treating equipment, apparatus, and the like can be appropriately selected, combined or designed.

The means for transferring the solution, which is necessary in the above treating steps, can be appropriately designed by selecting the material therefor, in accordance with the amount of the liquid to be treated or the quality of the liquid. Example of the transferring means include pumps. Of the pumps, a centrifugal pump can be mentioned. Further, about the pump to be used to introduce liquids of chemicals (such as sodium hydroxide or chlorine) necessary for the mineral addition or treatment, a material which is not corroded by the liquid of a chemical and a capacity corresponding to the amount to be used thereof can be appropriately selected or designed. As the pump for introducing the liquid of a chemical, a constant rate pump is preferably used.

To carry the air to introduce into the aeration tank, various blowing means can be used. An appropriate blowing means can be appropriately selected or designed in accordance with a required amount of the air. Examples of the blowing means include a blower and a compressor.

The material or the shape and volume of pipes and tanks for use in the treating facility are appropriately selected or designed, in accordance with a material(s), which does not elute out in the liquid to be treated, among those that does not suffer any damage or the like by the treated liquid, and the amount of the liquid to be treated. Examples of thereof include those made of, in addition to concrete, carbon steel, and cast iron; synthetic resin, such as vinyl chloride, or reinforced plastic; and a composite material thereof, e.g. those in which carbon steel is coated or lined with a synthetic resin.

It is possible that a level gauge, a flow rate meter, or/and any of various sensors, valves and other instruments are set up to the above-mentioned apparatuses, sections or the like, and connected to a controller or the like, thereby conducting the treatment automatically. Instruments necessary for the automation are appropriately selected or designed in accordance with the amount of the liquid to be treated, the quality of the liquid treated, and the treating steps to be applied.

Next, a preferred embodiment of the present invention is described in detail based on FIG. 1.

First, waste liquid (raw water) containing formaldehyde or the like discharged from a production plant 11 is passed through a line 31 or 41 so as to be collected in the waste liquid equalizing tank (pit) 12 and the formaldehyde converting tank 21. In the converting tank 21, a necessary amount of sodium hydroxide is sent from the alkali tank 22 to the converting tank 21 through a line 32 by means of a pump 27, thereby converting formaldehyde to methanol and formic acid. Meanwhile, as illustrated in FIG. 1, when the raw water is distributed to the waste liquid equalizing tank 12 and the formaldehyde converting tank 21, the distributing ratio between those tanks is not particularly limited and can be set arbitrarily as long as the objects of the present invention can be attained. Further, in FIG. 1, the raw water is sent to the waste liquid equalizing tank 12 and the formaldehyde converting tank 21, but it is also possible to send the entire amount of the raw water first to the waste liquid equalizing tank 12 and subsequently to the formaldehyde converting tank 21.

The thus-converted liquid to be treated is passed through a pump 28 and a line 33, to be jointed, in the MBR aeration tank 13, with the raw water sent from the waste liquid equalizing tank 12 through a pump 23 and a line 42.

The raw water and the converted liquid sent into the MBR aeration tank 13 are aerated at a temperature of about 30 to 40° C. in the MBR aeration tank 13. To the MBR aeration tank, the air is sent for aerobic microorganisms from a blower 24 through a line (not illustrated). A filter or the like is fitted to the tip of a pipe for supplying the air, if necessary. By the aeration, a part of volatile substances which becomes unable to be dissolved in the liquid under the aeration conditions, such as formaldehyde in the liquid to be treated, is separated from the waste liquid, and discharged from the MBR aeration tank to the atmosphere.

In the MBR aeration tank, formaldehyde, methanol, formic acid, and the like that remain in the liquid to be treated are decomposed into carbon dioxide gas, water, and the like, by the microorganisms in the activated sludge adhering to the outside surfaces of the hollow fibers which constitute the hollow fiber membrane modules 61, and then the resultant substances are moved into (permeated through) the hollow fibers, together with the resultant liquid to be treated. The liquid to be treated moved into the inside of the hollow fibers, is sent to a MBR treated-liquid reserving tank 14 through lines 43 and 44 by means of a suction pump 25, and reserved therein.

Meanwhile, on the bottom of the MBR aeration tank 13, the activated sludge (excessive sludge) peeled off down from the hollow fibers, and sedimentations of iron or the like may be deposited. Those are taken out regularly, by means of a line, a pump, and the like, which are not illustrated, and appropriately treated.

In the MBR treated-liquid reserving tank 14, the treated liquid from the MBR aeration tank 13 is reserved. The thus-reserved, treated liquid is sent to a filtrating section 15, which is, for example, a reverse osmosis (RO) membrane section, through a line 45 with a booster pump 26, at regular amount intervals, at regular time intervals, or in accordance with each of instructions of the controller or the like. In this way, the treated liquid is filtrated. As the booster pump 26, a pump capable of pressuring the liquid to a pressure required for the RO membrane is appropriately selected or designed.

In this RO membrane section 15, it is preferable to use a membrane that is capable of filtrating off nickel and cobalt, which are mainly used in DME synthesizing catalysts, further with the membrane's ratio of blocking the remaining formaldehyde, methanol, formic acid, and the like, being 60% or more.

The liquid thus filtrated in the RO membrane section 15 is passed through a line 46 and reserved temporarily in an RO membrane treated-liquid tank 16. In the case of reusing the liquid as drinking water, the liquid is sent to the sterilizing section 17 through a line 47 with a pump (not illustrated) or by the gravity, to be sterilized. Further, if necessary, a mineral or the like may be added to the liquid, and the resultant liquid is subjected to water-quality examination and then supplied as drinking water through a line 48.

Meanwhile, FIG. 1 illustrates the steps for the production of drinking water. Alternatively, in the case of reusing the liquid as irrigating water or industrial water in the usage of cooling water, the water come out from the MBR aeration tank 13 is subjected to a necessary treatment(s), and the resultant liquid can be used for the above-mentioned usage.

Further, in the case of using the liquid as industrial water for a boiler, the water come out from the RO membrane section 15 is subjected to a necessary treatment(s), and the resultant water can be used for that usage. For example, the water may be taken out from a line 50.

In the case of using the liquid as domestic intermediate water, any one of the above-mentioned waters can be used. The treatment may be finished at any of the treatment stages according to the necessity, then the resultant is subjected to a treatment necessary for intermediate water use, and the thus-treated water can be used for the intended usage.

Figure 2:
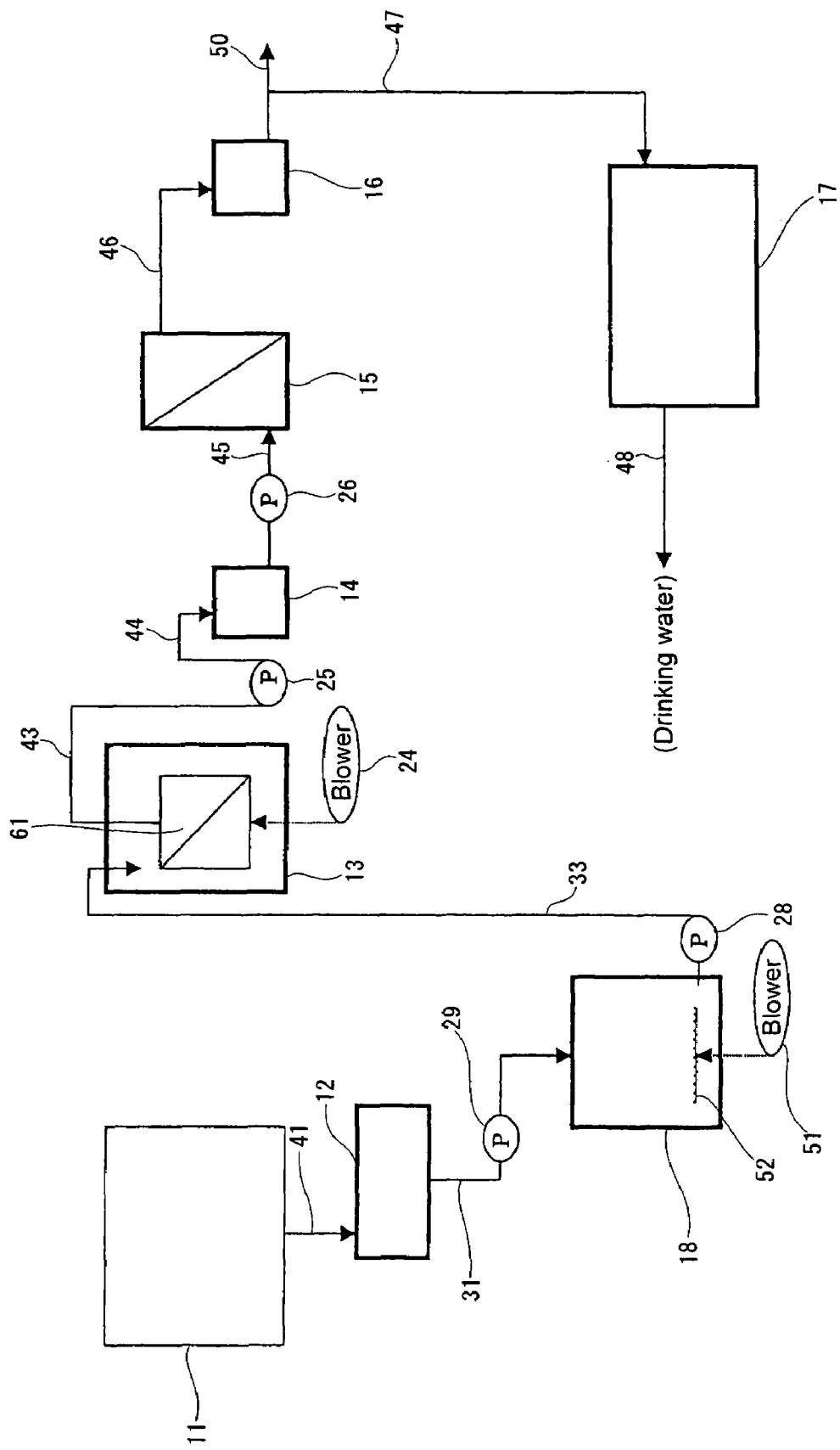
FIG. 2 is a schematic view of another example of a preferred facility for carrying out the present invention.

Next, another preferred embodiment of the present invention is described based on FIG. 2. Herein, in FIG. 2, the same reference numbers are given to the same elements as in FIG. 1.

In this embodiment, instead of the formaldehyde converting tank as in the first embodiment, an air oxidization tank (aeration tank) is set up, and waste liquid is aerated in the air oxidization tank, thereby oxidizing formaldehyde with the air so as to be converted into formic acid.

The waste liquid collected in a waste liquid equalizing tank (pit) 12 is sent to an air oxidization tank (aeration tank) 18 through a line 31 by means of an air oxidization tank supply pump 29.

In the air oxidization tank 18, the air is sent by means of a blower 51 through an air supplying pipe 52. If necessary, a filter or the like is set to an air supplying port of the air supplying pipe 52. In the air oxidization tank 18, formaldehyde in the waste liquid is aerated to be oxidized and converted to formic acid. Further, not only a part of formaldehyde is oxidized to formic acid but also a component(s) such as methanol diffuses into the air upon the aeration. The amount of the air to be used in the aeration is arbitrarily determined as an appropriate amount in accordance with the formaldehyde, formic acid, and the like in the waste liquid.

The waste liquid thus subjected to the air oxidization treatment by the aeration is then sent to an MBR aeration tank 13, through a line 33, by means of a bioreactor supply pump 28.

In this embodiment, other constituents, and actions and advantageous effects thereof are substantially the same as in the first embodiment. Thus, descriptions thereof are omitted.

The present invention will be described in more detail based on examples given below, but the invention is not meant to be limited by these.

EXAMPLES

Example 1

To 20 kg of waste liquid from a plant for the production of DME, the following treatment was conducted. The steps of the treatment was in accordance with those illustrated in FIG. 1. Main components of the waste liquid are shown in Table 1. Herein, the components of the waste liquid were measured, in accordance with a JIS method, as designated by the Japan Industrial Water Association.

TABLE 1

Components of supplied waste liquid (line Nos. 41 and 31)

| Component | Concentration (mg/L) |
| --- | --- |
| Formaldehyde | 160 |
| Methanol | <10 |

TABLE 1-continued

Components of supplied waste liquid (line Nos. 41 and 31)

| Component | Concentration (mg/L) |
|---|---|
| BOD | 300 |
| COD | 150 |
| Formic acid | 15 |
| TDS | 5 |
| Iron | 5 |

BOD: Biochemical oxygen demand
COD: Chemical oxygen demand
TDS: Total dissolved solids Of the waste liquid, 10 kg thereof was supplied to the pit 12, and the remainder was supplied to the formaldehyde converting tank 21. To the formaldehyde converting tank 21, 5 g of sodium hydroxide was added, to carry out Cannizzaro reaction.

The waste liquid reserved in the pit 12 and the liquid to be treated from the formaldehyde converting tank 21 were sent to the MBR aeration tank 13, and then treated, while being aerated, at 30 to 40° C. for 20 hours. The air flow rate at the time of the aeration was set to 3.6 $Nm^3/H$ per $m^3$ of the membrane. In the MBR, a single hollow fiber membrane module 61 using a microfiltration membrane (trade name: Sterapore, manufactured by Mitsubishi Rayon Co., Ltd.) was set. Further, activated sludge was applied by coating on the periphery of the hollow fibers.

After the completion of the treatment in the MBR aeration tank 13, the thus-treated liquid was sent to the MBR treated-liquid reserving tank 14. Main components of the liquid at an outlet of the aeration tank are shown in Table 2.

TABLE 2

Components of discharged waste liquid (line No. 43)

| Component | Concentration (mg/L) | Remarks |
|---|---|---|
| Formaldehyde | 2 | Removal ratio: 98.75% |
| Methanol | 1 | Reduction ratio: >90% |
| BOD | 30 | Reduction ratio: 90% |
| COD | 15 | Reduction ratio: 90% |
| Formic acid | 1.5 | Reduction ratio: 90% |
| TDS | 5 | Reduction ratio: 0% |
| Iron | 5 | Reduction ratio: 0% |

As described above, formaldehyde, which is a harmful material, was removed off from the liquid after the treatment, and the resultant liquid is able to be disposed at the outside of a plant, also from the viewpoint of the BOD and COD levels therein. Further, this treated liquid can be reused as irrigating water or industrial water for use in cooling water.

Furthermore, the liquid was pressurized with the pump 26, and filtrated with the reverse osmosis (RO) membrane section 15. As the reverse osmotic membrane, a spiral type (trade name: Romembra, manufactured by Toray Industries, Inc.) was used.

The liquid permeated through the RO membrane section 15 was reserved in the RO treated-liquid tank 16. Thereafter, the liquid was sent to the sterilizing section 17 and sterilized. The sterilization was conducted in a manner of pouring a solution of sodium hypochlorite. It was analyzed whether or not the thus-treated liquid after the sterilization contained E. Coliform bacteria. As a result, none of E. Coliform bacteria was detected at all.

By the above-mentioned treatments, drinking water can be supplied.

Example 2

Treatments were conducted in the same manner as in Example 1, except that the treatment steps were in accordance with those shown in FIG. 2. The air flow rate in the air oxidization tank was set to 2.4 $Nm^3$/hour per $m^3$ of the tank.

With respect to the treated liquid thus treated in the MBR aeration tank 13, components thereof were measured. As a result, similar to Example 1, formaldehyde, which is a harmful material, was removed off, and the resultant liquid is able to be reused as irrigating water or industrial water for use in cooling water.

Further, after the treatment with the MBR, the liquid was then subjected to the reverse osmosis filtration treatment and the sterilizing treatment, in the same manner as in Example 1. It was analyzed whether or not the thus-treated liquid after the sterilizing treatment contained a group of E. Coliform bacteria. As a result, none of E. Coliform bacteria was detected at all, and thus it is possible to supply drinking water.

Comparative Example

To 20 kg of waste liquid from a production plant of ethylene, the treatment was conducted in the same manner as in Example 1. Main components of the waste liquid are shown in Table 3.

TABLE 3

Components of waste liquid from ethylene production plant

| Component | Concentration (mg/L) |
|---|---|
| BOD | 500 |
| COD | 1000 |
| Phenol | 100 |
| SS | 60 |
| $H_2S$ | 1 |
| Oil | 20 |

With respect to the thus-treated liquid treated in the MBR aeration tank 13, components thereof were measured. Main components are shown in Table 4.

TABLE 4

Components of discharged waste liquid

| Component | Concentration (mg/L) | Remarks |
|---|---|---|
| BOD | 50 | Removal ratio: 90% |
| COD | 100 | Removal ratio: 90% |
| Phenol | 20 | Removal ratio: 80% |
| SS | <1 | Removal ratio: >98% |
| $H_2S$ | 0.5 | Removal ratio: 50% |
| Oil | <2 | Removal ratio: >90% |

As is apparent from the results in Table 4, salts or compounds harmful to human bodies were not removed off from the water after the treatment. Thus, the thus-treated liquid is even unable to be reused as irrigating water or industrial water for use in cooling water. Moreover, the liquid is also unable to be reused as agricultural water or domestic water including drinking water, since salts or the like are unable to be removed off by filtration treatment or sterilizing treatment according to the present invention.

INDUSTRIAL APPLICABILITY

The treating method of the present invention is preferable as a treating method for reusing, as a new water resource, waste liquid containing formaldehyde, which is formed as a byproduct in a plant for the production of hydrocarbons or oxygen-containing compounds, effectively at low costs.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method for treating a formaldehyde-containing waste liquid, comprising the steps of:
   subjecting formaldehyde in the liquid to chemical treatment to form a resulting waste liquid;
   treating the resulting waste liquid, while being aerated, by using a membrane bioreactor that is comprised of a microorganism or enzyme and a separation membrane to form a treated waste liquid;
   filtrating the treated waste liquid to form a filtrated waste liquid; and
   sterilizing the filtrated waste liquid to form a sterilized and filtrated waste liquid.

2. The method for treating the formaldehyde-containing waste liquid according to claim 1, wherein the membrane bioreactor is provided with activated sludge.

3. The method for treating the formaldehyde-containing waste liquid according to claim 1, wherein the chemical treatment is conducted by converting formaldehyde to formic acid.

4. The method for treating the formaldehyde-containing waste liquid according to claim 1, wherein the filtrating is reverse osmosis filtration.

5. The method for treating the formaldehyde-containing waste liquid according to claim 1, further comprising the step of adding a mineral or fertilizer after the sterilizing step.

6. The method for treating the formaldehyde-containing waste liquid according to claim 1, additionally comprising the step of reclaiming the sterilized and filtrated waste liquid.

7. The method for treating the formaldehyde-containing waste liquid according to claim 6, wherein the formaldehyde-containing waste liquid is formed as a byproduct during the production of dimethyl ether from a hydrocarbon via methanol, or during the production of liquid fuel oil from natural gas via synthetic gas.

8. The method for treating the formaldehyde-containing waste liquid according to claim 1, wherein at least part of the formaldehyde is converted to methanol or formic acid.

9. The method for treating the formaldehyde-containing waste liquid according to claim 1, wherein the microorganism or enzyme of the membrane reactor is sensitive to the formaldehyde concentration.

10. The method for treating the formaldehyde-containing waste liquid according to claim 1, wherein the initial formaldehyde concentration in the waste liquid is between 100 mg/l and 200 mg/l.

11. The method for treating the formaldehyde-containing waste liquid according to claim 6, wherein the membrane bioreactor is provided with activated sludge.

12. The method for treating the formaldehyde-containing waste liquid according to claim 6, wherein the chemical treatment is conducted by converting at least a portion of the formaldehyde to formic acid.

13. The method for treating the formaldehyde-containing waste liquid according to claim 6, wherein the filtrating is reverse osmosis filtration.

14. The method for treating the formaldehyde-containing waste liquid according to claim 6, further comprising the step of adding a mineral or fertilizer to the resulting liquid, after the sterilizing step.

15. A method for treating a formaldehyde-containing waste liquid, comprising the steps of:
   converting formaldehyde in a waste liquid to at least one other substance to lower the formaldehyde concentration in the waste liquid and forming a resulting formaldehyde-containing waste liquid; and
   treating the resulting formaldehyde-containing waste liquid, while being aerated, by using a membrane bioreactor that is comprised of a microorganism or enzyme and a separation membrane.

16. The method for treating the formaldehyde-containing waste liquid according to claim 15, wherein the membrane bioreactor is provided with activated sludge.

17. The method for treating the formaldehyde-containing waste liquid according to claim 15, wherein the chemical treatment is conducted by converting formaldehyde to formic acid.

18. The method for treating the formaldehyde-containing waste liquid according to claim 15, further comprising the step of filtrating after the treating step with the membrane bioreactor.

19. The method for treating the formaldehyde-containing waste liquid according to claim 18, wherein the filtrating is reverse osmosis filtration.

20. The method for treating the formaldehyde-containing waste liquid according to claim 18, further comprising the step of sterilizing after the filtrating step.

21. The method for treating the formaldehyde-containing waste liquid according to claim 20, further comprising the step of adding a mineral or fertilizer after the sterilizing step.

\* \* \* \* \*